(12) United States Patent
Presley

(10) Patent No.: US 6,286,893 B1
(45) Date of Patent: Sep. 11, 2001

(54) FRONT WING WITH COCKPIT ADJUSTMENT

(75) Inventor: William T Presley, Macomb Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/583,165

(22) Filed: May 30, 2000

Related U.S. Application Data

(60) Provisional application No. 60/174,250, filed on Jan. 3, 2000.

(51) Int. Cl.[7] .................................................. B61H 11/10
(52) U.S. Cl. .............................................................. 296/180.5
(58) Field of Search ........................................... 296/180.5

(56) References Cited

U.S. PATENT DOCUMENTS

| | | | | |
|---|---|---|---|---|
| 3,618,998 | * | 11/1971 | Swauger | 296/180.5 |
| 4,119,339 | * | 10/1978 | Heimburger | 296/180.5 |
| 4,159,140 | * | 6/1979 | Chabot et al. | 296/180.5 |
| 4,457,558 | * | 7/1984 | Ishikawa | 296/180.5 |
| 4,489,806 | * | 12/1984 | Shimomura | 296/180.5 |
| 4,558,897 | * | 12/1985 | Okuyama et al. | 296/180.5 |
| 4,770,457 | * | 9/1988 | Tonforde | 296/180.5 |
| 4,904,016 | * | 2/1990 | Tatsumi et al. | 296/180.5 |
| 5,660,243 | | 8/1997 | Anzalone et al. | |
| 6,209,947 | * | 4/2001 | Rundels et al. | 296/180.1 |

* cited by examiner

Primary Examiner—D. Glenn Dayoan
Assistant Examiner—Paul Chenevert
(74) Attorney, Agent, or Firm—Mark P. Calcaterra

(57) ABSTRACT

A wing mechanism for selectively exerting a downwardly directed force to a vehicle. The wing mechanism includes a wing member, an axle, a pair of pivot arms and a drive assembly. The wing member is adapted to be pivotably coupled to the vehicle body about a first axis. The axle is adapted to be pivotably coupled to the vehicle body about a second axis parallel to the first axis. Each of the pivot arms has a first end and a second end wherein the first end of each pivot arm is pivotably coupled to the wing member and the second end of each pivot arm is coupled for rotation with the axle. The drive assembly is coupled to the axle and operable for selectively positioning the axle in a rotational position to adjust an angular position of the wing structure.

11 Claims, 3 Drawing Sheets

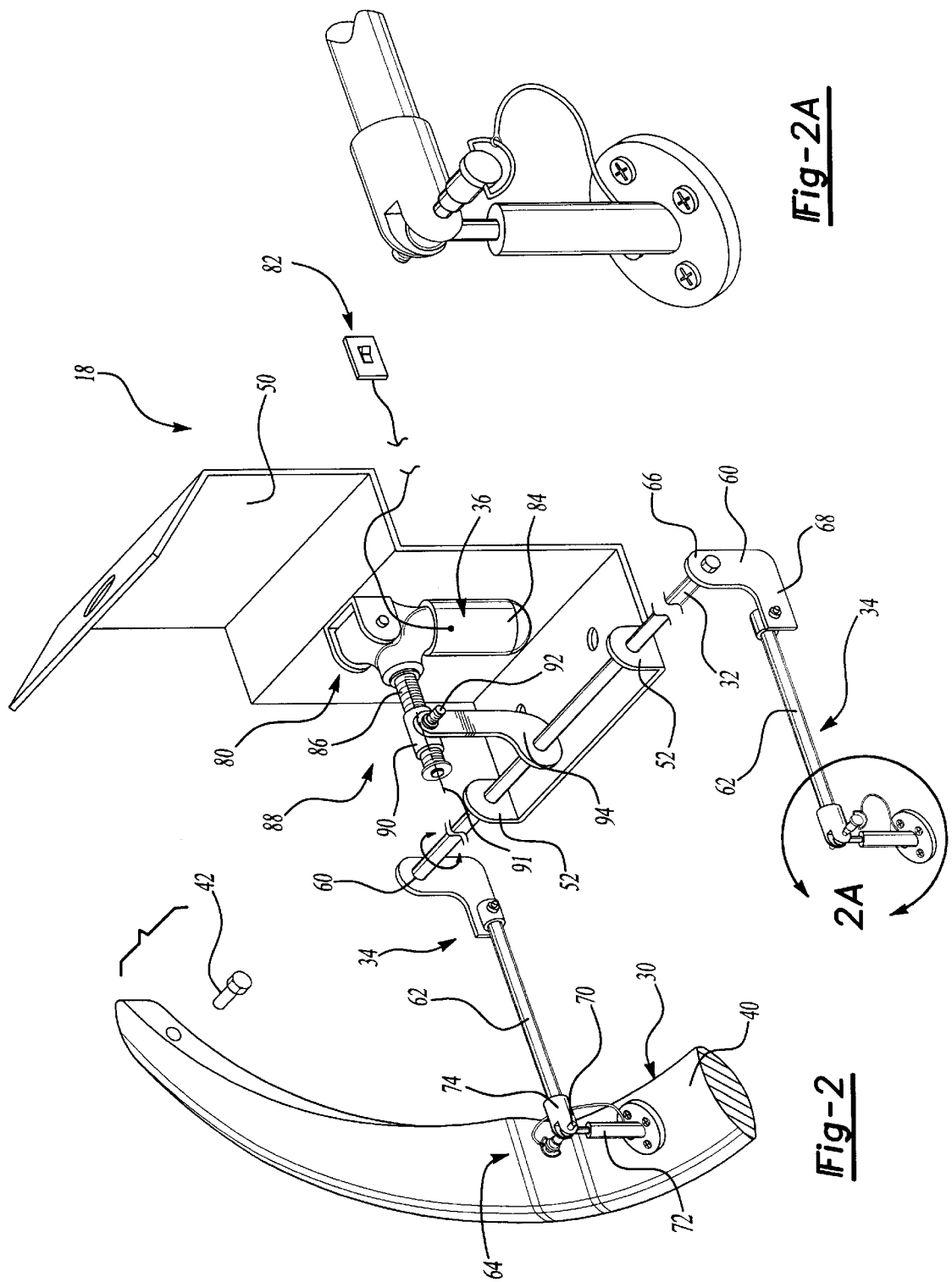

FRONT WING WITH COCKPIT ADJUSTMENT

This application claims the benefit of U.S. Provisional Application No. 60/174,250, filed Jan. 3, 2000.

BACKGROUND OF THE INVENTION

1. Technical Field

The present invention relates generally to wing mechanisms, air spoilers and air foils for a motor vehicle and more particularly to a front wing mechanism that may be selectively positioned from within the vehicle cockpit.

2. Discussion

Modernly, various types of front spoilers or wing mechanisms for motor vehicles have been proposed in order to improve the high-speed stability of vehicles. Some of the front wing mechanisms are of a fixed type in which a spoiler fin or wing member is unmovably mounted to a forward portion of the vehicle. However, front wing mechanisms of this type are known to negatively affect the performance of the vehicle when the vehicle is operated at relative low speeds.

SUMMARY OF THE INVENTION

It is one object of the present invention to provide a front wing mechanism with a wing member that may be selectively moved to vary the magnitude of a downwardly directed force produced by the wing member.

It is another object of the present invention to provide a front wing mechanism with a drive assembly for adjusting the rotational position of a wing member that is relatively compact and actuatable from within the vehicle cockpit.

In one form, the present invention provides a wing mechanism for selectively exerting a downwardly directed force to a vehicle is provided. The wing mechanism includes a wing member, an axle, a pair of pivot arms and a drive assembly. The wing member is adapted to be pivotably coupled to the vehicle body about a first axis. The axle is adapted to be pivotably coupled to the vehicle body about a second axis parallel to the first axis. Each of the pivot arms has a first end and a second end wherein the first end of each pivot arm is pivotably coupled to the wing member and the second end of each pivot arm is coupled for rotation with the axle. The drive assembly is coupled to the axle and operable for selectively positioning the axle in a rotational position to adjust an angular position of the wing structure.

Additional advantages and features of the present invention will become apparent from the subsequent description and the appended claims, taken in conjunction with the accompanying drawings.

BRIEF DESCRIPTION OF THE DRAWINGS

FIG. 2 is a fragmentary perspective view of the wing mechanism of FIG. 1;

DETAILED DESCRIPTION OF THE PREFERRED EMBODIMENT

Figure 1:
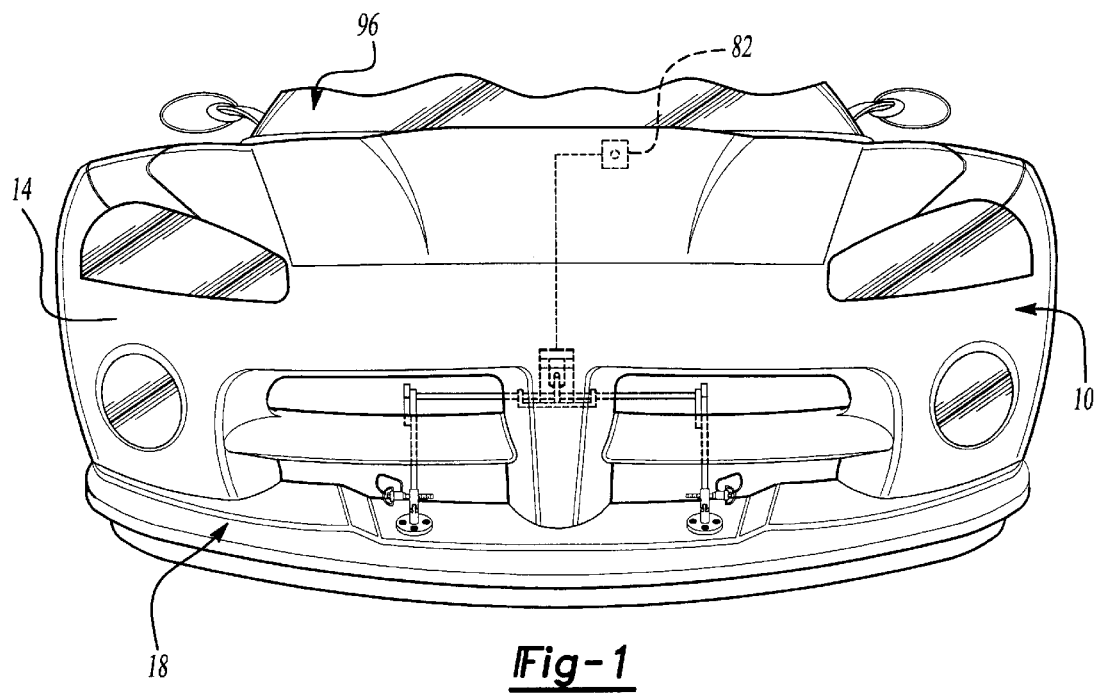
FIG. 1 is a perspective view of a vehicle having a wing mechanism constructed in accordance with the teachings of the present invention.

With reference to FIG. 1 of the drawings, a vehicle constructed in accordance with the teachings of the present invention is generally indicated by reference numeral 10. As will be discussed in greater detail below, vehicle 10 includes a vehicle body 14 and a wing mechanism 18, which may be articulated between first and second angular positions to vary the magnitude of a downwardly exerted force which is transmitted from wing mechanism 18 to vehicle body 14. Although the particular vehicle illustrated is a two-door sport coupe, it will be understood that the teachings of the present invention have applicability to other types of vehicles.

Figure 3:
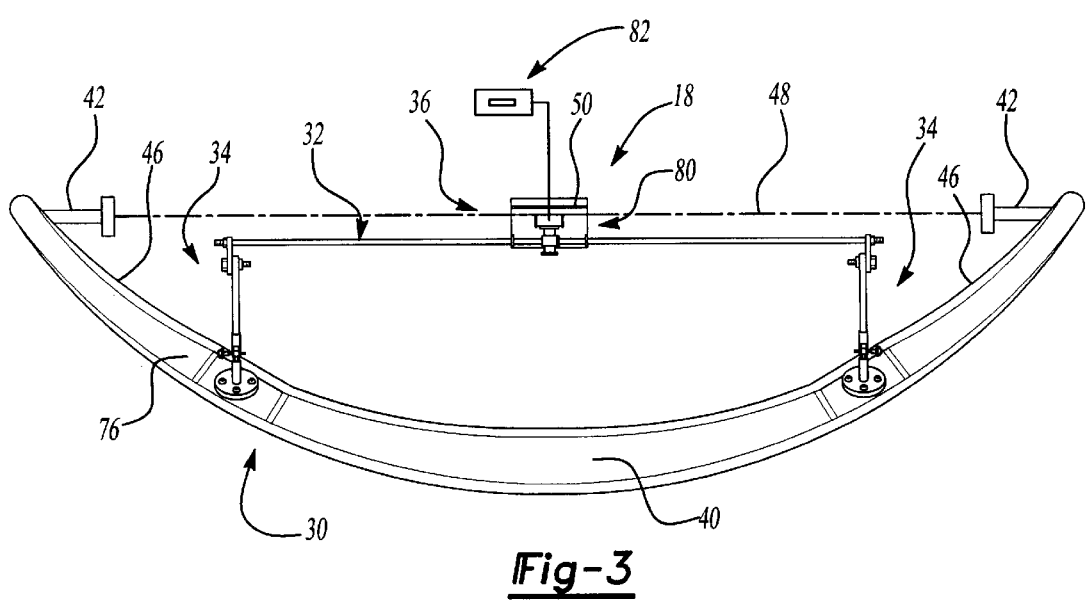
FIG. 3 is a plan view of the wing mechanism of FIG. 1.
Figure 4:
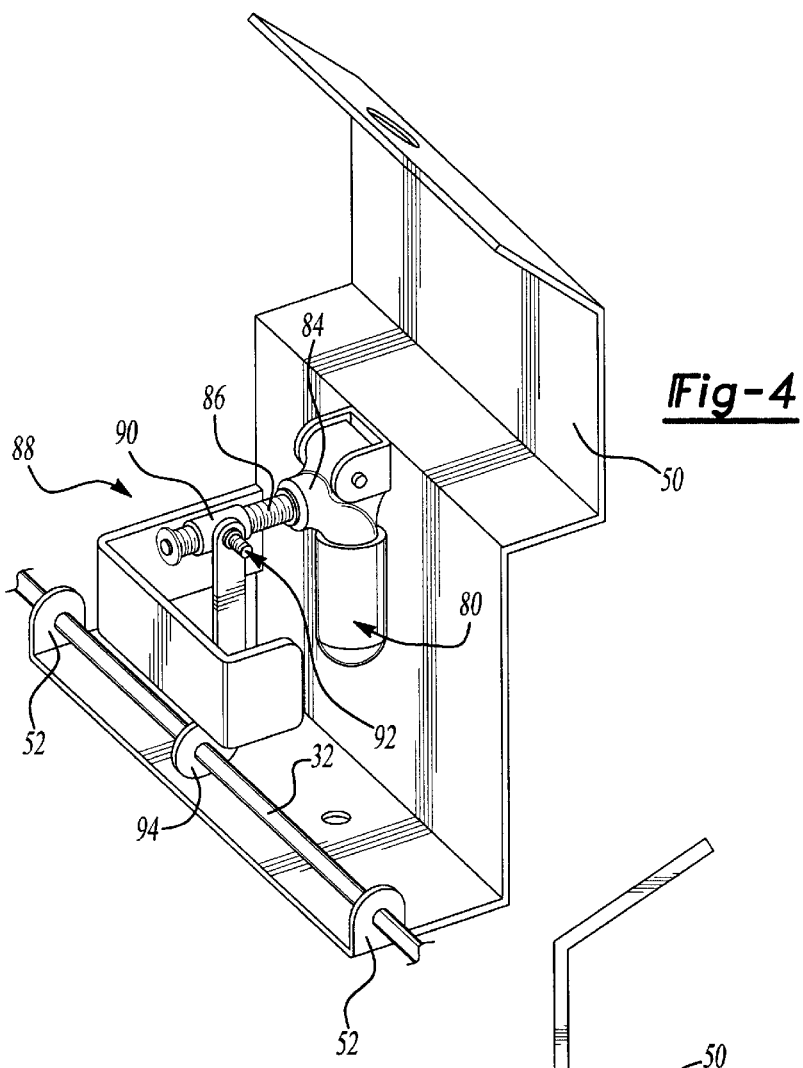
FIG. 4 is an enlarged view of a portion of the wing mechanism of FIG. 1 illustrating a portion of the drive assembly in greater detail.

In FIGS. 2 through 4, wing mechanism 18 is shown to include a wing structure 30, an axle 32, a pair of pivot arms 34 and a drive assembly 36. Wing structure 30 includes a wing member 40 and a pair of pivot pins 42. In plan view, wing member 40 is shown to have an arcuate shape that conforms to the front of vehicle body 14. The cross-section of wing member 40, as taken perpendicular to the arcuate longitudinal axis of wing member 40, has an air foil-like shape that is configured to generate a downwardly directed force when air passes over its exterior surfaces.

Pivot pins 42 are coupled to opposite inner sides 46 of wing member 40, lying along an axis 48 that is perpendicular to the longitudinal axis of vehicle body 14. Pivot pins 42 are adapted for coupling wing member 40 to vehicle body 14 for rotation about axis 48.

A mounting bracket 50 couples axle 32 and a portion of drive assembly 36 to vehicle body 14. Mounting bracket 50 includes a pair of trunnions 52 through which axle 32 is disposed. Axle 32 is a cylindrical member that is oriented along an axis that is parallel to axis 48 and permitted to rotate freely within trunnions 52.

Each of the pivot arms 34 is shown to include a fixed elbow 60, a spacing arm 62 and an articulating elbow 64. Fixed elbow 60 is generally L-shaped and includes a first end 66 which is coupled for rotation with axle 32. A second end 68 of fixed elbow 60 is fixedly coupled to a first end of spacing arm 62. Articulating elbow 64 is also generally L-shaped but includes a pivot pin 70 which permits its first end 72 to rotate relative to its second end 74. The first end 72 of articulating elbow 64 is fixedly coupled to the upper exterior surface 76 of wing member 40. The second end 74 of articulating elbow 64 is fixedly coupled to spacing arm 62.

In FIGS. 2 through 5, drive assembly 36 is shown to include a drive mechanism 80 and an actuator 82. Drive assembly 36 is operable for selectively rotating axle 32 within trunnions 52. In the particular embodiment illustrated, drive mechanism 80 includes a drive motor 84, a lead screw 86 and a follower 88. Actuator 82 is coupled to drive motor 84 and is operable for selectively causing the drive shaft (not shown) of drive motor 84 to rotate in first and second rotational directions. Actuator 82 is mounted inside the vehicle passenger compartment defined by the vehicle body 14 so as to permit a seated vehicle occupant to actuate actuator 82. Lead screw 86 is coupled for rotation with the drive shaft of drive motor 84. Follower 88 includes an internally threaded portion 90, a pivot pin 92 and an arm 94. The internal threads of internally threaded portion 90 threadably engage the external threads of lead screw 86. Pivot pin 92 pivotably couples internally threaded portion 90 to a first end of arm 94. The distal end of arm 94 is fixedly coupled to axle 32.

During the operation of vehicle 10, an operator seated within the passenger compartment 96 defined by vehicle body 14 (shown in FIG. 1) can selectively operate actuator 82 to cause drive motor 84 to rotate in one of the first and second rotational directions. Operation of drive motor 84 causes lead screw 86 to rotate in a corresponding direction to drive internally threaded portion 90 in an axial direction along the axis 91 of lead screw 86. Movement of internally threaded portion 90 along axis 91 causes arm 94 to pivot about pivot pin 92 and rotate axle 32. The rotational movement of axle 32 is transmitted through pivot arms 34 into wing structure 30, causing wing member 40 to pivot about axis 48. Pivoting wing member 40 in this manner permits the vehicle operator to vary the downwardly directed force produced by the air foil-like cross section of wing structure.

Figure 5:
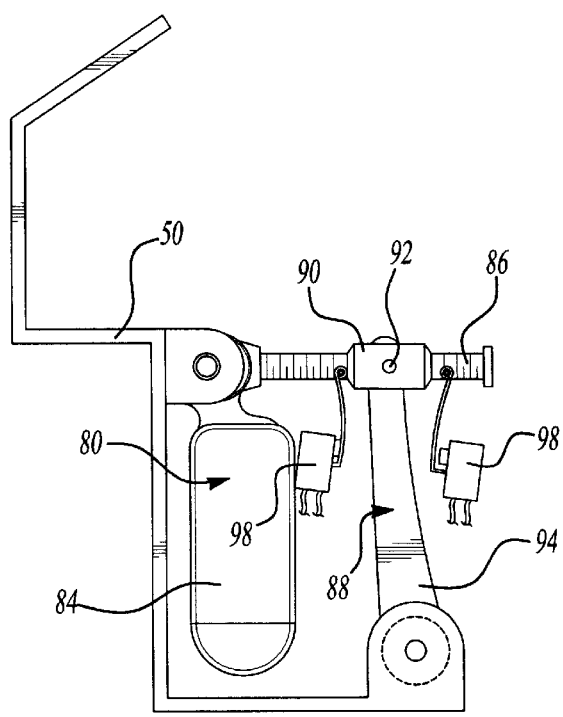
FIG. 5 is a side view of the wing mechanism of FIG. 1 illustrating a portion of the drive assembly in greater detail.

As shown in FIG. 5, drive assembly 36 may also include control devices, such as limit switches 98, which effectively limit the operational range of drive mechanism 80 to prevent the wing member 40 from being adjusted in an undesirable orientation or to prevent portions of the wing mechanism 18 from interfering or contacting one another in an undesirable manner. In the particular embodiment illustrated, limit switches 98 are operable for limiting the travel of internally threaded portion 90 along the length of lead screw 86.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A wing mechanism for exerting a downwardly directed force to a vehicle having a vehicle body, the wing mechanism comprising:
   a wing member adapted to be pivotably coupled to the vehicle body for rotation about a wing pivot axis; and
   a drive assembly coupled to the wing member and operable for selectively positioning the wing member to an intermediate position between a fully raised position and a fully lowered position to thereby adjust a magnitude of the downwardly directed force, the drive assembly including a motor, an actuator a first switch and a second switch, the motor operable in a first direction for rotating the wing member in a first direction, the motor operable in a second direction for rotating the wing member in a second direction opposite the first direction, the actuator coupled to the motor and operable for controlling the motor, the actuator adapted to be mounted within the vehicle body and actuatable by a vehicle operator, wherein the first switch is operable for inhibiting the motor from moving the wing member upwardly past the fully raised position and the second switch is operable for inhibiting the motor from moving the wing member downwardly past the fully lowered position.

2. The wing mechanism of claim 1, wherein the wing mechanism further includes an axle and a pivot arm, the axle adapted to be pivotably coupled to the vehicle body about a second axis parallel to the wing pivot axis, the pivot arm fixedly coupled to the axle and pivotably coupled to the wing member, the drive assembly coupled to the axle such that the axle is rotatable in response to rotation of the motor.

3. The wing mechanism of claim 2, wherein the drive assembly further includes a lead screw and a follower, the lead screw rotatably coupled to the motor, the follower having an internally threaded portion and an arm member, the internally threaded portion threadably engaging the lead screw and pivotably coupled to the arm member, the arm member fixedly coupled to the axle such that translation of the internally threaded portion along the lead screw causes the arm member to rotate the axle.

4. An automotive vehicle comprising:
   a vehicle body defining a passenger compartment; and
   a wing mechanism having a wing member, a pair of pivot pins and a drive assembly, the wing member being arcuate in shape and having an inner side, each of the pivot pins being coupled to the inner side of the wing member proximate an end portion of the wing member, the pivot pins being rotatably coupled to the vehicle body for rotation about a first axis, the drive assembly being selectively controllable to adjust a position of the wing member to an intermediate position between a fully raised position and a fully lowered position, the drive assembly having an axle, a pair of pivot arms, a motor, a lead screw, a follower, a first switch and a second switch, the axle being pivotably coupled to the vehicle body about a second axis parallel to the first axis, each of the pivot arms including a first end and a second end, the first end of each of the pair of pivot arms being pivotably coupled to the wing member, the second end of each of the pair of pivot arms being coupled for rotation with the axle, the motor being coupled to the vehicle body, the lead screw rotatably coupled to the motor, the follower having an internally threaded portion and an arm member, the internally threaded portion threadably engaging the lead screw and pivotably coupled to the arm member, the arm member fixedly coupled to the axle such that translation of the internally threaded portion along the lead screw causes the arm member to rotate the axle, the first and second switches being operable for limiting the translation of the internally threaded portion along the lead screw such that the position of the wing member is maintained between the fully raised position and the fully lowered position.

5. An automotive vehicle comprising:
   a vehicle body defining a passenger compartment; and
   a wing mechanism having a wing member and a drive assembly, the wing member being pivotably coupled to the vehicle body for rotation about a wing pivot axis, a drive assembly coupled to the wing member and operable for selectively positioning the wing member to an intermediate position between a fully raised position and a fully lowered position to thereby adjust a magnitude of a downwardly directed force produced by the wing member, the drive assembly including a motor, an actuator a first switch and a second switch, the motor operable in a first direction for rotating the wing member in a first direction, the motor operable in a second direction for rotating the wing member in a second direction opposite the first direction, the actuator coupled to the motor and operable for controlling the motor, the actuator mounted to the vehicle body within the vehicle passenger compartment and adapted to be actuated by a vehicle operator, wherein the first switch is operable for inhibiting the motor from moving the wing member upwardly past the fully raised position and the second switch is operable for inhibiting the motor from moving the wing member downwardly past the fully lowered position.

6. The automotive vehicle of claim 5, wherein the wing mechanism further includes an axle and a pivot arm, the axle adapted to be pivotably coupled to the vehicle body about a second axis parallel to the wing pivot axis, the pivot arm fixedly coupled to the axle and pivotably coupled to the wing member, the drive assembly coupled to the axle such that the axle is rotatable in response to rotation of the motor.

7. The automotive vehicle of claim 6, wherein the drive assembly further includes a lead screw and a follower, the lead screw rotatably coupled to the motor, the follower having an internally threaded portion and an arm member, the internally threaded portion threadably engaging the lead screw and pivotably coupled to the arm member, the arm member fixedly coupled to the axle such that translation of the internally threaded portion along the lead screw causes the arm member to rotate the axle.

8. The automotive vehicle of claim 7, wherein the drive assembly further includes a pair of switches for contacting the follower at first and second positions, the first position corresponding to a predetermined first rotational position of the wing member and the second position corresponding to a predetermined second rotational position of the wing member.

9. A wing mechanism for selectively exerting a downwardly directed force to a vehicle having a vehicle body, the wing mechanism comprising:

a wing member adapted to be pivotably coupled to the vehicle body about a first axis;

an axle adapted to be pivotably coupled to the vehicle body about a second axis parallel to the first axis;

a pair of pivot arms each having a first end and a second end, the first end of each of the pair of pivot arms pivotably coupled to the wing member, the second end of each of the pair of pivot arms coupled for rotation with the axle; and a drive assembly coupled to the axle and operable for selectively positioning the axle in a predetermined rotational position between a first rotational position and a second rotational position to adjust an angular position of the wing structure the drive assembly including a first switch and a second switch, the first and second switches being operable for limiting the rotational position of the axle between the first and second rotations positions;

wherein rotation of the axle causes a magnitude of a downwardly directed force produced by the wing member to be adjusted to a predetermined level.

10. The wing mechanism of claim 9, wherein the drive assembly includes a motor and an actuator, the motor operable in a first direction for rotating the wing member in a first direction, the motor operable in a second direction for rotating the wing member in a second direction opposite the first direction, the actuator coupled to the motor and operable for controlling the motor, the actuator mounted to the vehicle body within the vehicle passenger compartment and adapted to be actuated by a vehicle operator.

11. The wing mechanism of claim 10, wherein the drive assembly further includes a lead screw and a follower, the lead screw rotatably coupled to the motor, the follower having an internally threaded portion and an arm member, the internally threaded portion threadably engaging the lead screw and pivotably coupled to the arm member, the arm member fixedly coupled to the axle such that translation of the internally threaded portion along the lead screw causes the arm member to rotate the axle.

* * * * *